April 13, 1943.  M. A. POWERS  2,316,749
CELLULAR GLASS AND PROCESS FOR ITS MANUFACTURE
Filed Nov. 10, 1938
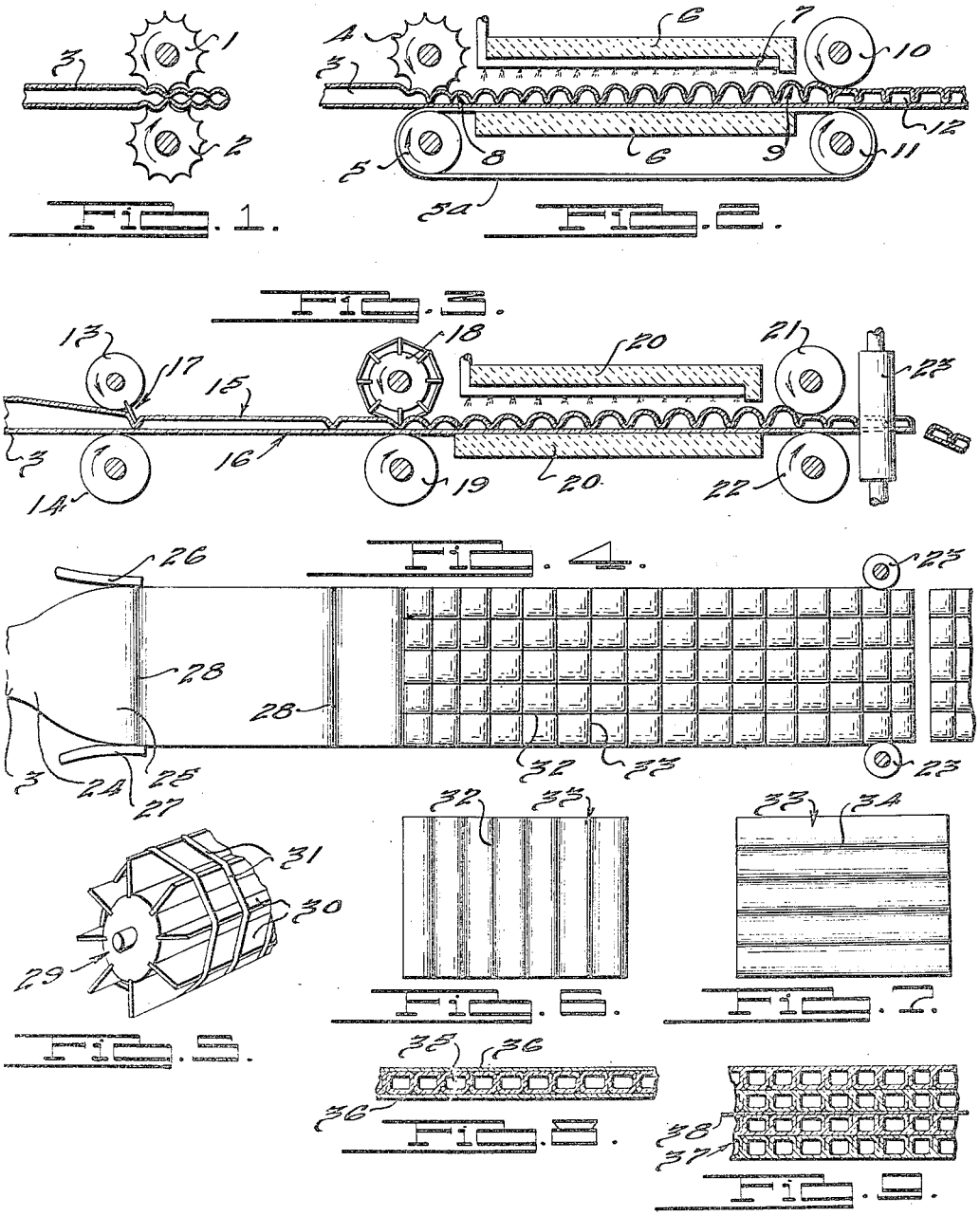
INVENTOR
Milton A Powers Patented Apr. 13, 1943

2,316,749

UNITED STATES PATENT OFFICE 2,316,749

CELLULAR GLASS AND PROCESS FOR ITS MANUFACTURE

Milton A. Powers, Detroit, Mich.

Application November 10, 1938, Serial No. 239,859

6 Claims. (Cl. 49—84)

This invention relates to glass products of special form particularly adapted for use in building construction and for other applications where their special qualities make them useful. Likewise my invention also includes the processes of manufacture and assembly of the various forms.

One of the principal objects is to provide glass products of formed cellular construction for use where a strong material, of good heat insulating ability, and capacity to transmit light is desired. Other advantages will become apparent as the disclosure progresses, and one or more of these desirable properties may make the product particularly useful for a specific application.

This application is a continuation in part of my application #49,265 filed November 11, 1935, (now Patent No. 2,187,432, granted January 16, 1940) for a glass insulating material and process of manufacture. The present application describes variations in the methods of the earlier application and a new series of products resulting from improved methods to be described.

An important object is to provide a practical process for making a number of glass products in large volume by automatic methods, which, due to the low cost of both the raw material and fabrication, results in final products whose cost makes them attractive for use on a large scale.

Another object is to produce a glass material which will be of good insulating quality and readily applied for window use as an improvement over the conventional double pane window construction.

Yet another object is to provide a glass building block of light weight and great strength finding ready use for both load bearing outside walls and for partition walls where light transmission is desired. Furthermore, by special assembly methods numerous colored lighting effects and filtering actions are practical, while at the same time minimum heat transmission is possible.

The foregoing and further objects of the invention will appear upon a study of the following detailed description when taken in conjunction with the accompanying drawing and the appended claims.

Referring now to the drawing wherein like numerals are employed to designate like parts wherever they occur:

Figure 1 is a vertical side view of a glass tube in soft heated condition passing between the imprinting rolls of my process in its simplest form.

Figure 2 is a vertical side view of a soft heated glass tube passing thru a set of imprinting rolls, thence thru a re-expansion furnace following which the final sizing rolls bring the product to finished form.

Figure 3 is a somewhat similar process to that of Figure 6, except for the important steps of flattening a large diameter tube and section sealing the flattened tubing during fabrication and preceding the imprinting operation.

Figure 4 is a top view of the material during processing which will more clearly define the various steps in the process.

Figure 5 is a perspective part view of one form of an imprinting roll as used in the process shown in Figures 3 and 4.

Figure 6 is a top view of one form of the imprinted product having transverse sealed passages.

Figure 7 is a top view of a form like that of Figure 6, except that the passages are lengthwise of the product as it is fabricated.

Figure 8 is a section view of one product assembled from my special imprinted material sealed between two covers of window or plate glass.

Figure 9 is one form intended to illustrate the many desirable combinations possible—consisting in this case of a unit comprising four layers of imprinted glass separated by a special dividing wall.

In all instances the basic glass material supplied for my processes preferably consists of newly formed glass tubing, which is introduced while still in its soft heated state. A suitable method for producing such tubing is disclosed in my aforesaid patent, wherein molten glass is discharged downward from an orifice and over a hollow mandril thru which a suitable gas is simultaneously supplied to form and fill the hollow tubing. However, my present invention is not limited to this process alone but may also be practiced in conjunction with the Danner tubing machine or the Fourcault process, due attention being paid, of course, to the particular requirements of each process in relation to the direction in which the glass flows from the tubing machine. Thus the Danner process will feed the tubing horizontally, the Fourcault process vertically upward, while my own process feeds vertically downward. In each case the diameter and thickness of the tubing is readily controlled as well as its rate of discharge which is coordinated to the requirements of my process. Where immediately adjoining location of tube and fabrication processes is not feasible, reheating to the proper entry temperature will be necessary. In every case my description starts with tubing of proper dimensions and viscosity, preferably continuously supplied, and containing a heated gas or condensable vapor.

In Figure 1 two imprinting wheels 1 and 2 are rotating as shown with each wheel so geared to the other as to cause them to operate in unison with the opposing teeth in each wheel tending to touch tip to tip. However, this is prevented by the intervening soft glass tubing 3, the mutually directed force between the two wheels being sufficient to seal the opposite sides of the tube together, yet not strong enough to cut off the tubing into sections. Thus we have exactly the same basic mechanism and process disclosed in my earlier application. In fact, during the development of the original process I was successful in producing continuous lengths of sealed glass pillows, the potential value of which impressed me at the time, and which are now fully developed as hereafter described.

The product of Figure 1 as mentioned is a more or less continuous series of attached "pillows." The pressure between imprinter blades is enough to unite the soft glass of the opposing walls of the tube, but not sufficient to crack or shatter the glass itself. Thus each sealed pillow is free from possible leakage to the atmosphere or to its adjoining likeness. By using steam or some similar condensing vapor as fully described in my earlier application, maximum vacuum at normal temperatures is obtained although good vacuums are likewise produced due to the contraction upon cooling of air or other gases.

Now referring to Figure 2 we see the same soft glass tubing 3 entering the imprinting rolls 4 and 5 which rotate in unison. However, while roll 4 is similar in construction to the rolls of Figure 1, roll 5 in this case is smooth, and thus leaves only a flat smooth surface on its side of the tubing. The imprint of roll 4 is such that the full downward deflection in the soft glass is made by it, thus producing a series of flat bottomed pillows with upwardly rounded tops. As a supporting aid to transporting the soft glass in its partly fabricated form I have shown a continuous belt 5A which rotates with the imprinting roll 5 and also passes over sizing roll 11. While this belt is desirable it is not essential to the working of my process.

The continuous series of pillows have a certain height, with a fixed volume of gas sealed inside each. It will be readily apparent that the pressure of the gas was the force which caused the pillows to bulge upward between the blades of the imprinting roll, otherwise the two sides of the tubing would have tended to become flattened together. However, depending upon conditions at the moment of forming of the pillow a certain definite amount of gas is trapped therein. If the pillows are allowed to cool the gas pressure drops with the decrease in temperature. However, in the present instance we would like to increase the volume of each pillow in order to procure a better formed final product.

Referring to Figure 2 we find the pillowed tubing enter a reheating furnace 6 supplied with a suitable heat source such as the extended gas burner 7. Immediately the glass absorbs heat, its viscosity decreases and concurrently the pressure of the gas inside increases, due to the rise in its temperature. The glass becoming softer and the gas pressure higher, there is an immediate increase in the size of the pillow. In other words, the pillows puff up very materially depending upon the exact temperature conditions impressed upon them. When this method is applied with care, the volume of the pillows can be doubled under closely controlled temperature and timing conditions.

However, great care must be exercised to prevent overheating, which will rapidly change success to failure in this part of the process. Continued heating after maximum reexpansion has been obtained further softens the glass. As the glass becomes more fluid the rapidly increasing force of surface tension tends to draw the walls together and decrease the size of the pillow. Under these circumstances the internal gas pressure is increasingly less than the contracting force of surface tension and the pillow takes on a spherical shape and becomes smaller. As a matter of fact this part process in connection with the individual capsules of my aforesaid patent is an excellent method for producing hollow spheres in volume at low cost, successful practice further depending upon continuous motion of the capsules, somewhat like popping corn, to promote even heating and to prevent sticking.

In Figure 2 the entering pillows at 8 are seen to increase in volume as they progress through the furnace until they reach the desired maximum size at 9. At this point they leave the furnace and enter a pair of sizing rolls 10 and 11. The position of these rolls determine the thickness of the pillows and at the same time the flattening action of roll 10 depresses the curved tops to produce a substantially flat top surface. During this time the gas pressure inside expands the side walls of the pillows until they approach parallelism and contact, each with its neighbor. This produces a sized product 12 of superior strength and usefulness. The continuous flow of pillows may be broken to any desired length and assembled in any one of the variety of forms to be described later. As an aid to separation at regular intervals, imprinter 4 or 5 can be arranged with one or more sharp imprint blades which will weaken the continuous length at regular intervals to assist in separation by breakage upon discharge and cooling.

In Figures 3 and 4 are shown important advances in my processes. Here the entering tubing 3 is relatively large in diameter. Flattening by rolls 13 and 14 produces parallel top and bottom walls 15 and 16 respectively, but because of the greater initial diameter the transverse distance is large. For example, a seven inch diameter tube at 3 will produce a flat section coming from rolls 13 and 14 approximately twelve inches wide.

For the moment we will consider roll 13 as perfectly smooth disregarding blade 17. In such case the remainder of the process basically duplicates the process described in Figure 2. However, we now have a very wide and relatively poorly supported top wall 15 in comparison with the top wall passing under imprint roll 4 of Figure 2 which has two nearby side walls, being formed of smaller diameter tubing. Such being the case it is evident that the imprinter 18 Figure 3 will tend to drop top wall 15 against wall 16.

To prevent this, roller 13 is provided with an imprint blade 17 which at relatively long intervals seals the glass into gas tight sections. It is apparent that the gas trapped in each section has no possibility of escape and therefore must use its space requirements to bell the pillows upward between the blades of the imprint roll 18. To take full advantage of this action there must always be an intervening sealing wall between the blades of imprint roll 18 and roll 13, which means that they must be spaced some little distance apart.

In order to take full advantage of the supporting strength of the side walls of the tube 3 it may be found preferable to apply imprint blade 17 (without the roller) to the glass in circular section and later apply a sizing roll 13 to bring the walls into spaced parallel relationship. Thus the flattening action of the imprint blade and roller do not occur simultaneously and better results may be obtained.

It may be found desirable to reheat the glass between rolls 13 and 18 (means not shown). Further, of course, in all cases the various rolls are interlocked so they rotate in unison. Thus the blades of 18 can be arranged to coincide with the impression of blade 17. Furthermore 17 can be arranged to weaken the product at intervals to give spaced separation upon discharge.

Now referring to Figure 4, in connection with Figure 3, we see a plan view of the glass in process. As the tube 3 flattens it widens as shown between points 24 and 25. Side guides 26 and 27 (which might also be rolls) hold the proper width and center the glass. Imprint blade 17 leaves imprints 28 while roll 18 leaves a series of sealing imprints. These imprints are both crosswise and lengthwise leaving a surface of raised square pillows. These then pass through the reexpansion process in furnace 20. Following this they go between sizing rolls 21 and 22 and edge sizing rolls 23.

Imprint roll 18 may be made as shown in Figure 5, which shows a smooth roll 29 with radially extending thin blades 30, etc. along the axis of the roll. At right angles are circumferentially spaced wire blades 31, with outer edges of blades and wires at the same radial distance. This construction produces a light weight imprinter of relatively low cost which does not chill the glass excessively yet cools rapidly between imprints. Of course the imprint rolls may be constructed to produce a wide variety of product appearances and this description is merely intended to illustrate one pattern and one possible construction.

Another form of material is illustrated in Figure 6 as produced by an imprint wheel like Figure 5, but without the circumferential blades. Here the sealed spaces within the glass extend the full width of the material with closed ends. If an imprint roll like Figure 5, however less the transverse but with circumferential blades is used, we will form material as shown in Figure 7 with a continuous raised surface as at 33 with sealed surfaces along the line 34. Other forms may be desired for certain applications and are readily obtained.

It might be mentioned here that it is possible to vary the glass thickness of different points in the glass at will. For example, application of additional heat to the top of the tube, at 3 will result in a thinner top wall and a thicker bottom wall as the glass becomes flattened. The same principle can be applied at other points in the process, if desirable.

Let us consider, for example, that the glass discharged has a width of twelve inches, a height of one-half inch, and breaks into twelve inch lengths. By taking two panes of window or plate glass twelve inches square and cementing or otherwise attaching them on either surface of the processed section, we have a new glass product as shown in section in Figure 8, where 35 is the special center with 36 the outer panes. This product will find ready application as heat insulating glass for use in window frames where high optical transparency is not required. It has the further distinct advantage of being structurally strong, and not subject to the moisture condensation problems of the usual two pane construction.

By taking four processed sections 37 as shown in Figure 9 and sealing them into a single unit we have a fine quality glass block of great strength and excellent insulating quality. If desired one or more outer panes of smooth glass may be added (not shown). Furthermore, as shown in Figure 9 we may incorporate a thin member 38 which can be of colored transparent material; for example, a pane of red glass, or blue transparent pyroxilin plastic, with or without ornamentation, or any one of a numerous group of variations. It may be a sheet of reflective aluminum foil and, of course, may be applied in the center, at any level through the glass assembly or on the outer surface. Furthermore, of course, one or more of the processed sections may be made of a special kind or color of glass for producing special scenic effects.

While one general type of process has been described as preferable, variations are both practicable and may in some circumstances be advantageous. For example, instead of mounting the single sealing imprint blade in a rotating member, the same result may be accomplished by providing a reciprocating mount whereby the blade is depressed to seal the section while advancing with the moving glass, later to rise and return for the next sealing operation.

Likewise the multiple imprinter may have the same motion, serving to seal all of the "pillows" in the section simultaneously. This action furthermore has the advantage of maintaining equal gas pressure in all "pillows" and consequently tends to make for a more symmetrical final product. Where this particular method of procedure is adopted, the subsequent reexpansion described earlier may not be necessary. Furthermore, a flattening action may also be obtained in the imprinting mechanism by providing a limiting back plate on the imprinter to prevent excessive expansion. This member may make unnecessary the use of the final sizing and flattening roll.

The final product also may be assembled as a multiplicity of layers held together by a suitable cementing material such as sodium silicate, glyptol resin, methyl methacrylate resin, Bakelite, or latex. Adhesion may also be obtained by sintering at softening temperature of the glass, but while this method will make a rigid product it has the distinct disadvantage of requiring a long annealing period to reduce strains. The earlier mentioned cements, while possibly subject to deterioration if exposed to atmospheric conditions, are in this case well protected. Furthermore, they act somewhat as a resilient buffer between layers and thus decrease cracking and provide greater total strength.

It is my desire to be protected upon the preferred methods described and upon all others which fall within the scope of the following claims.

I claim:

1. The process of transforming glass tubing while plastic comprising pinching the tubing at intervals to produce a series of sealed spaces, expanding said spaces by application of heat, flattening the walls of said spaces to produce spaces of even thickness and dividing the product into sections.

2. The process of transforming plastic glass comprising flattening so two opposing walls are substantially parallel, pinching the walls together along closely spaced lines to produce a multiplicity of bulging sealed spaces, thereafter flattening the walls of said spaces, and dividing the product into sections each comprising a plurality of said sealed spaces.

3. The process of transforming plastic glass tubing comprising flattening so two opposing walls are substantially parallel, pinching the walls together to produce a reltaively long sealed space, and further pinching the walls of said relatively long sealed space together to produce a multiplicity of sealed smaller spaces.

4. The process of transforming plastic glass tubing comprising flattening so two opposing walls are substantially parallel, pinching the walls together to produce a series of relatively long sealed spaces, further pinching the walls of each relatively long sealed space together to produce a multiplicity of smaller sealed spaces, expanding such spaces by application of heat, flattening the walls of said spaces, and dividing the product into sections.

5. The method of making a multiple-cell insulating panel from glass, consisting in forming a substantially flat tube in plastic condition and containing a gaseous medium and operating against at least one side of the tube to press the walls together in substantially line contact along transverse and longitudinal sets of lines that are closely spaced when compared to the thickness of the tube, to thus form a multiplicity of cells within which the gaseous medium is entrapped, expanding said cells through heat application, reshaping them, and then cooling them to hardness.

6. The method of making a multiple cell panel, comprising the steps of issuing a glass tube from a molten bath while simultaneously injecting a hot gas into the tube, partially flattening the tube to provide two opposed walls of large area, pressing said walls together into cohesion along widely spaced transverse lines to form sealed gas-filled envelopes and then, while the material of each envelope is still plastic, pressing the walls of each envelope together along further closely spaced lines to form a multiplicity of cells.

MILTON A. POWERS.